US006360314B1

(12) United States Patent
Webb, Jr. et al.

(10) Patent No.: US 6,360,314 B1
(45) Date of Patent: Mar. 19, 2002

(54) DATA CACHE HAVING STORE QUEUE BYPASS FOR OUT-OF-ORDER INSTRUCTION EXECUTION AND METHOD FOR SAME

(75) Inventors: David Arthur James Webb, Jr., Groton; James B. Keller, Waltham, both of MA (US); Derrick R. Meyer, Austin, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/115,186

(22) Filed: Jul. 14, 1998

(51) Int. Cl.[7] ................................................. G06F 9/38
(52) U.S. Cl. ...................... 712/219; 712/218; 712/206
(58) Field of Search ................................. 712/216, 218, 712/219, 206; 710/129; 711/150

(56) References Cited

U.S. PATENT DOCUMENTS

| 5,307,477 A | | 4/1994 | Taylor et al. ................ 395/425 |
| 5,448,699 A | * | 9/1995 | Goss et al. .................. 710/102 |
| 5,479,630 A | | 12/1995 | Killian ........................ 395/403 |
| 5,557,763 A | * | 9/1996 | Senter et al. .................. 712/23 |
| 5,613,081 A | | 3/1997 | Black et al. ................. 395/403 |
| 5,619,662 A | | 4/1997 | Steely, Jr. et al. .......... 395/392 |
| 5,717,883 A | * | 2/1998 | Sagar .......................... 712/218 |
| 5,737,636 A | | 4/1998 | Caffo et al. .................. 395/874 |
| 5,867,644 A | * | 2/1999 | Ranson et al. ................. 714/39 |
| 5,897,666 A | * | 4/1999 | Mallick et al. .............. 711/217 |

OTHER PUBLICATIONS

Gieseke, B. A., et al., "A 600MHz Superscalar RISC Microprocessor with Out-Of-Order Execution," 1997 IEEE Internaional Solid-State Circuits Conference, Dig. Tech. Papers, pp. 176–177 and 451 (Feb., 1997).

Leibholz, D. and Razdan, R., "The Alpha 21264: A 500 MHZ Out-Of-Order Execution Microprocessor," *Proceedings of IEEE COMPCON '97*, (Feb., 1997).

Gwennap, L., "Digital 21264 Sets New Standard," *Microprocessor Report,* pp. 11–16 (Oct. 28, 1996).

* cited by examiner

Primary Examiner—Richard L. Ellis
Assistant Examiner—Gautam R. Patel
(74) Attorney, Agent, or Firm—Hamilton Brook Smith & Reynolds, P.C.

(57) ABSTRACT

A bypass mechanism is disclosed for a computer system that executes load and store instructions out of order. The bypass mechanism compares the address of each issuing load instruction with a set of recent store instructions that have not yet updated memory. A match of the recent stores provides the load data instead of having to retrieve the data from memory. A store queue holds the recently issued stores. Each store queue entry and the issuing load includes a data size indicator. Subsequent to a data bypass, the data size indicator of the issuing load is compared against the data size indicator of the matching store queue entry. A trap is signaled when the data size indicator of the issuing load differs from the data size indicator of the matching store queue entry. The trap signal indicates that the data provided by the bypass mechanism was insufficient to satisfy the requirements of the load instruction. The bypass mechanism also operates in cases in which multiple prior stores to the same address are pending when a load that needs to read that address issues.

12 Claims, 6 Drawing Sheets

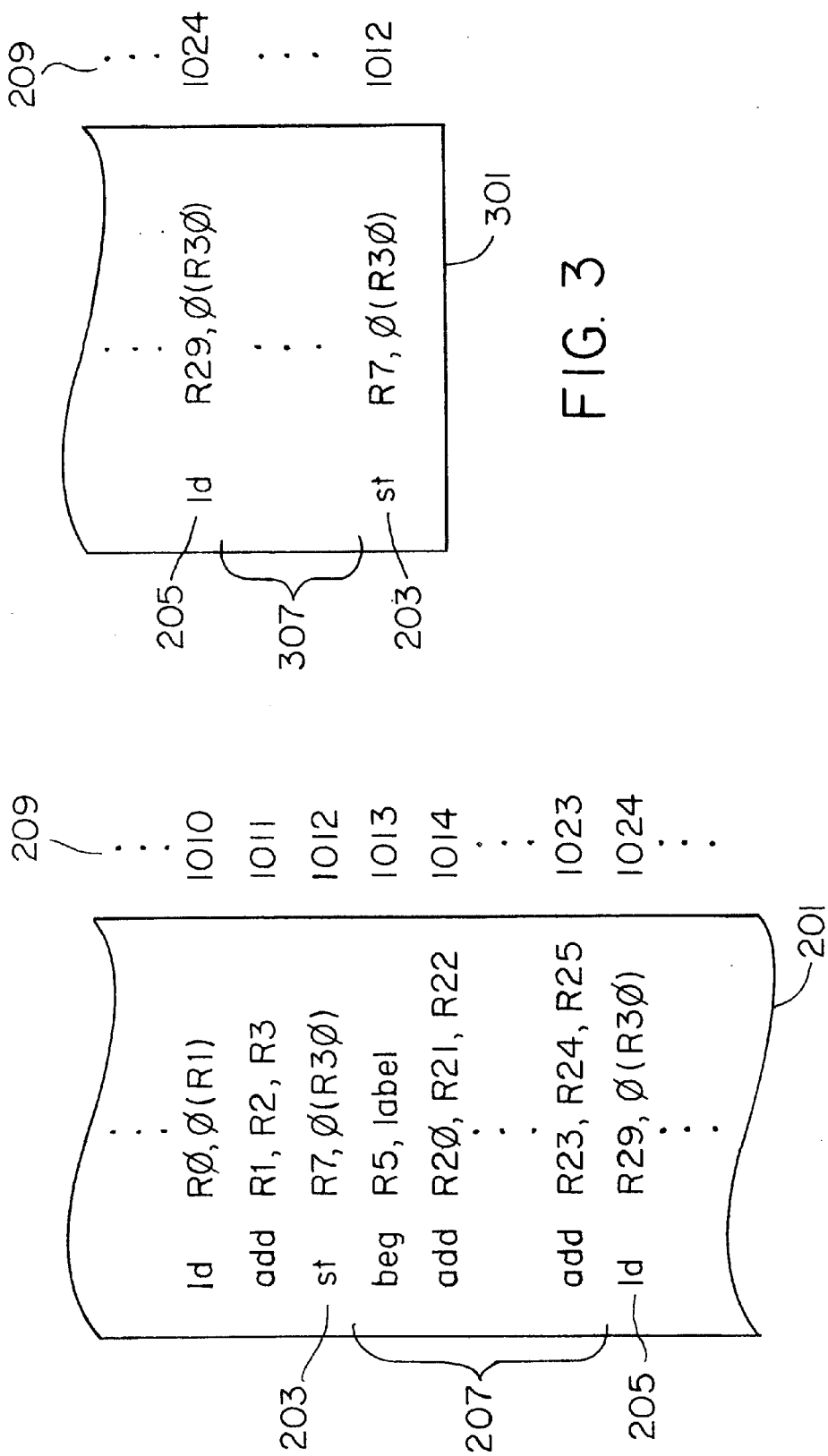

WRONG SIZE / FORMAT

DATA CACHE HAVING STORE QUEUE BYPASS FOR OUT-OF-ORDER INSTRUCTION EXECUTION AND METHOD FOR SAME

BACKGROUND OF THE INVENTION

A computer program is an ordered set or sequence of instructions to be processed, or executed, by a computer processor. The processor fetches the program instructions and places them in an instruction queue. Normally, instructions are fetched and issued sequentially, with breaks in the sequence occurring when a branch or jump instruction is encountered. The order in which the instructions are fetched is the program order.

Many modern microprocessors allow instructions to execute out-of-order from the queue. In particular, instructions are executed from the queue, out of program order, depending on, for example, (i) register dependencies and/or (ii) memory dependencies. A register dependency relates to the availability of registers required by a subject instruction. A memory dependency relates to a memory address which needs to be calculated at execution time of the subject instruction and thus is unable to be known during the time instructions are scheduled for execution.

Thus, on the one hand, the out-of-order execution of instructions improves performance because it allows more instructions to complete in the same amount of time by efficiently distributing instructions among the computing resources of the microprocessor. On the other hand, problems may occur when executing load and store instructions out-of-order.

A data cache stores data that has been recently used by a processor and is likely to be used again. When the processor executes a program instruction, it first looks for the data in the data cache. If the data is not found in the cache, the required data is retrieved from main memory and placed in the cache. The general term "memory" as used herein refers to both cache and main memory.

The terms load, load instruction and load operation instruction are used herein interchangeably and refer to instructions which cause data to be loaded, or read, from cache or main memory. Similarly, store, store instruction and store operation instruction are used interchangeably and refer to instructions which cause data to be written to memory.

When a load instruction issues before an older store instruction referencing the same address, the load may retrieve an incorrect value because the store data the load should use is not yet present at the address.

SUMMARY OF THE INVENTION

To further compound the problem of out-of-order execution of loads and stores, there may be multiple prior stores to the same address that are still pending when a load that needs to read that address issues. It can also be the case that a prior store was for a data size that is smaller than the data size of a subsequent load instruction.

The present invention addresses the above-noted problems by providing a bypass mechanism that compares the address of each load with a set of recent stores that have not yet updated memory. A match of the recent stores provides the desired load data instead of having to retrieve the data from memory.

Accordingly, in a computing system that includes an execution unit for executing load and store instructions and a data cache subsystem, a bypass method for accessing the data cache subsystem comprises (a) providing a store queue for holding issued stores, the store queue having at least a store queue entry comprising a store queue address, and (b) providing a store data buffer having at least a store data entry corresponding to the store queue entry and comprising at least a data byte. An address of an issuing load is compared against the store queue address for each store queue entry. In response to an address match between the issuing load and a particular store queue entry, the store data entry in the store data buffer that corresponds to the particular store queue entry (referred to as the "address-matching store queue entry") is passed to the execution unit when the issuing load is younger in program order than the address-matching store queue entry.

According to an aspect of the invention, each store queue entry and the issuing load includes a data size indicator. Subsequent to the data bypass, the data size indicator of the issuing load is compared against the data size indicator of the address-matching store queue entry. A trap is signaled when the data size indicator of the issuing load differs from the data size indicator of the address-matching store queue entry. The trap signal indicates that the data provided by the bypass mechanism was insufficient to satisfy the requirements of the load instruction.

According to another aspect of the invention, a physical address of the issuing load is compared against the store queue address of each store queue entry. In response to a physical address match between a first address portion of the issuing load and a particular store queue entry, a trap is signaled when there is a mismatch between a second address portion of the issuing load and the physical-address-matching store queue entry and the issuing load is younger in program order than the physical-address-matching store queue entry.

According to a further aspect of the invention, each store queue entry includes a match status indicator. An address of an issuing store is compared against the store queue address of each store queue entry. In response to an address match between the issuing store and a particular store queue entry, the match status indicator is set for the address-matching store queue entry when the issuing store is younger in program order than the address-matching store queue entry; otherwise, the match status indicator is set for the issuing store. The store data entry in the store data buffer corresponding to the address-matching store queue entry is passed to the execution unit when the issuing load is younger in program order than the address-matching store queue entry and the match status indicator for the address-matching store queue entry is not set. Subsequently, a physical address of the issuing load is compared against the store queue address of each store queue entry and in response to a physical address match between the issuing load and a particular store queue entry, a trap is signaled when the issuing load is younger in program order than the physical-address-matching store queue entry and the match status indicator for the physical-address-matching store queue entry is set.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIG. 2 is a diagram showing an instruction stream as it enters the instruction queue of FIG. 1.

FIG. 3 is a diagram illustrating a re-ordered execution order of the instruction stream of FIG. 2.

DETAILED DESCRIPTION OF THE INVENTION

Figure 1:
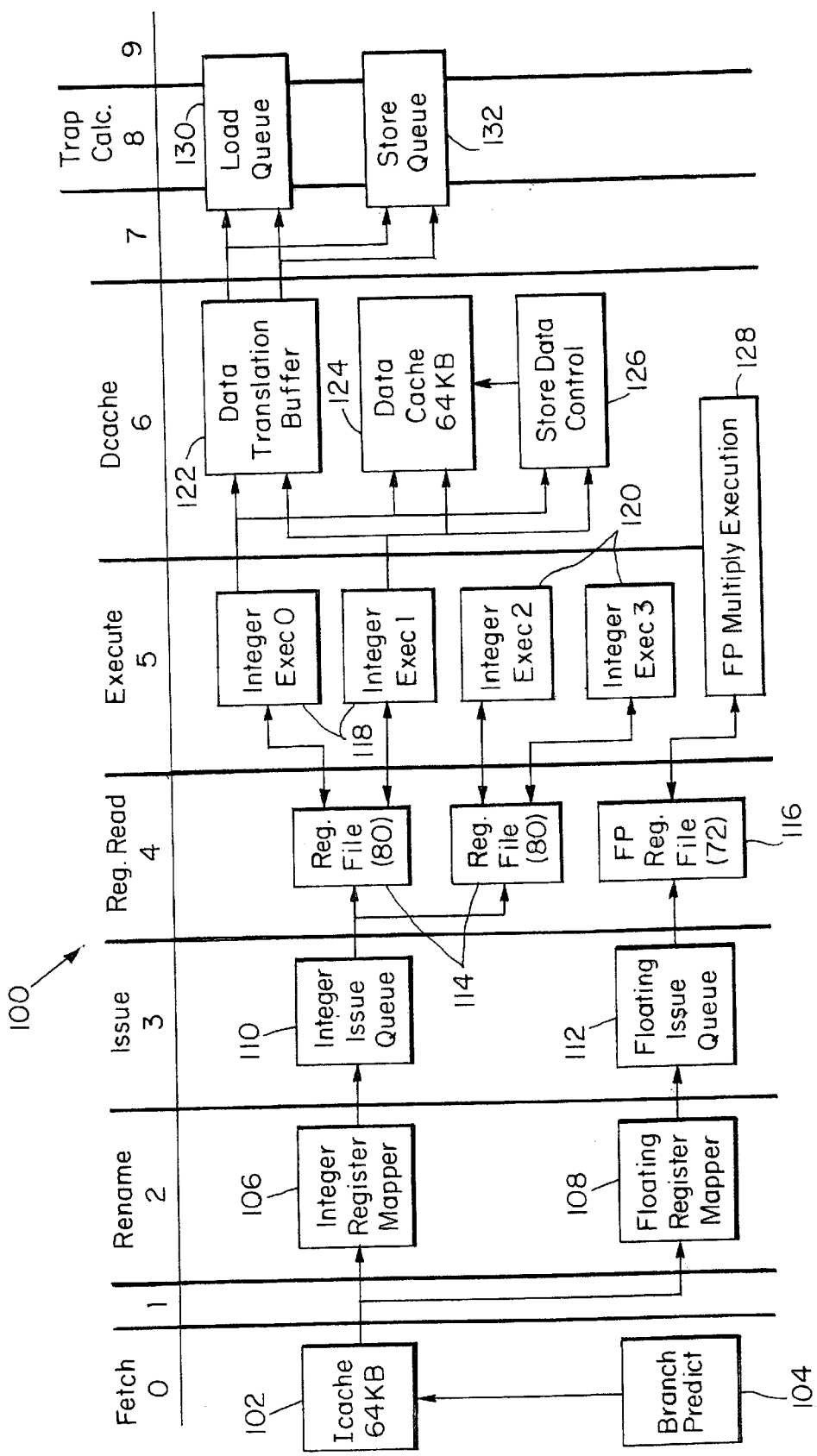
FIG. 1 is a block diagram illustrating typical stages of a processor instruction pipeline.

The invention is described with reference to a preferred embodiment, a device known as the Alpha model no. 21264 microprocessor. FIG. 1 shows stages of an instruction pipeline 100 for the preferred embodiment. In stage 0, the fetch stage, one or more instructions are fetched, typically from an instruction cache 102 using results from a branch predict unit 104 and passed onto stage 1. In stage 1, the slot stage, the instructions are slotted or decoded. In stage 2, the rename stage, virtual registers named in the instructions are renamed or mapped to physical registers by integer register mapper 106. Instruction identifiers are assigned to instructions during this stage.

In stage 3, the issue stage, instructions are written into integer and floating point instruction queues 110 and 112, respectively. The instruction queue decides which instructions are to issue based on available resources such as registers and execution units, and re-orders the instructions accordingly, assigning the issuing instructions to execution units.

Next, in stage 4, the register read stage, any registers are read as required by the issued instructions using 80-entry integer register files 114 and 72-entry floating point register file 116. In stage 5, the execute stage, the instructions are executed by integer execution units 118, 120 and floating point multiply execution unit 128. Any memory references which must be derived are calculated during this stage.

Stages 6 through 9 are memory stages. In stage 6, the data cache stage, data is read from, or written to a data cache 124 depending on whether a load or store is executing. Also in stage 6, a Data Translation Buffer 122 is accessed to translate Virtual Address to a Physical Address. A Store Data Control 126 performs address comparisons which are part of a bypass mechanism.

In stage 7, the Physical address is transported to a Load Queue 130 and Store Queue 132 and written into one of those structures depending on whether a load or store, respectively, was executed. Address comparisons between the new address and all current queue entries are also performed in this stage 7.

In stage 8, address comparisons from stage 7 and other information, such as data size and instruction age, are combined into Trap calculations as described further herein. In stage 9, Trap signals are transmitted to the Instruction Cache 102.

FIG. 2 shows an instruction stream 201 as it enters the instruction queue 110 of FIG. 1. Instructions are placed in the queue 110 in the order in which they are encountered in the stream 201. The instruction labeled 203, "st R7,0(R30)" is a store instruction. When it is executed at stage 5 of FIG. 1, the data in register R7 is stored in a target memory location whose address is the sum of 0 and the contents held in register R30. This target address must be computed during the execution stage 5 of the instruction pipeline 100 (FIG. 1).

The instruction labeled 205, "ld R29,0(R30)" is a load instruction. When it is executed at stage 5 in FIG. 1, the memory location is referenced whose address is again the sum of 0 and the contents held in register R30, and the data held in this referenced memory location is loaded into register R29. Other instructions 207 may be fetched between store instruction 203 and load instruction 205. When the value held by register R30 is the same for both instructions 203, 205, the load instruction 205 is dependent on the store instruction 203 because the load instruction 205 needs to read the data stored in memory by the store instruction 203.

As instructions from stream 201 enter the instruction queue 110, they are assigned instruction numbers (INUM) 209, here shown in decimal form. Specifically, a value of 1012 has been assigned as the INUM to the store instruction 203, and a value of 1024 has been assigned as the INUM to the load instruction 205.

As stated above, depending on available resources, instructions are issued out-of-order from the instruction queue 110. A re-ordered issue stream 301 is shown in FIG. 3. Here it can be seen that the load 205 and store 203 instructions have issued out-of-order. This could be, for example, because register R7 is not yet available to the store instruction 203. In any event, if register R30 contains the same value for both instructions 203, 205, the load instruction 205 will potentially be reading in the wrong data because it needs the data to be stored by the store instruction 203.

To avoid the above-noted problem, the present invention provides a bypass mechanism that compares the address of each load instruction with a set of recent stores that have not yet updated memory. A match of the recent stores provides the desired load data instead of having to retrieve the data from memory.

Figure 4:
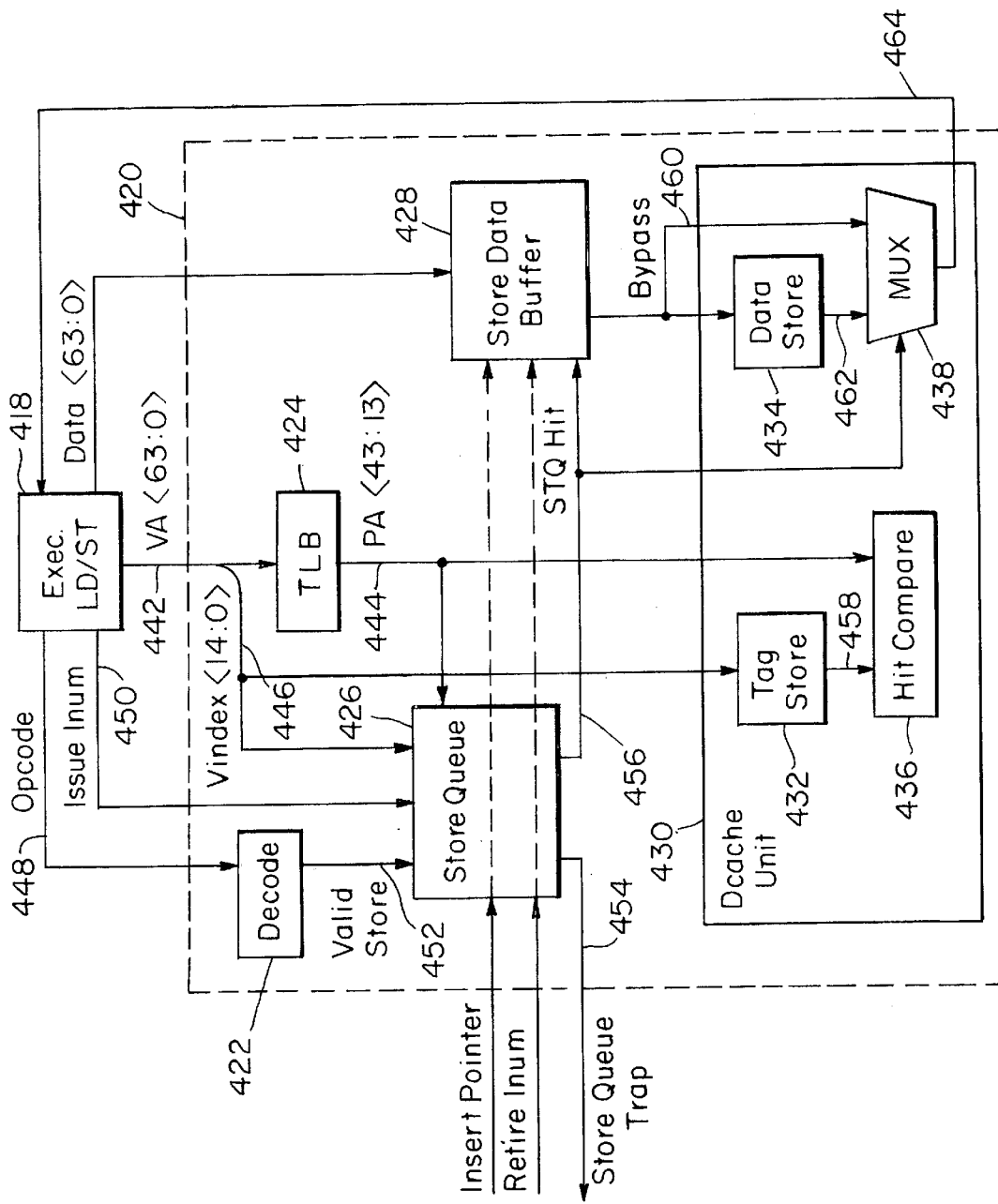
FIG. 4 is a block diagram showing a data cache subsystem in accordance with the present invention.

Referring now to FIG. 4, a block diagram shows a data cache subsystem 420 in accordance with the present invention. The data cache subsystem 420 operates in conjunction with an execution unit 418 that performs load/store processing associated with pipeline stage 5 (FIG. 1). The data cache subsystem 420 includes a decode unit 422, a translation look-aside buffer (TLB) 424, a store queue 426, a store data buffer 428 and a data cache (dcache) unit 430. In the preferred embodiment, the dcache unit 430 is a 64 KB, 2-way set-associative, virtually-indexed and physically-tagged data cache. The dcache unit 430 includes tag store 432, data store 434, hit compare logic 436 and multiplexer 438.

The data cache subsystem includes a decode unit which examines the Opcode of the issuing instruction. Information such as whether the operation is a load or store is extracted. Also extracted is information such as whether the data type is Integer data or Floating-Point data, and what the data size is, Quadword, Longword, Word, or Byte.

Figure 5:
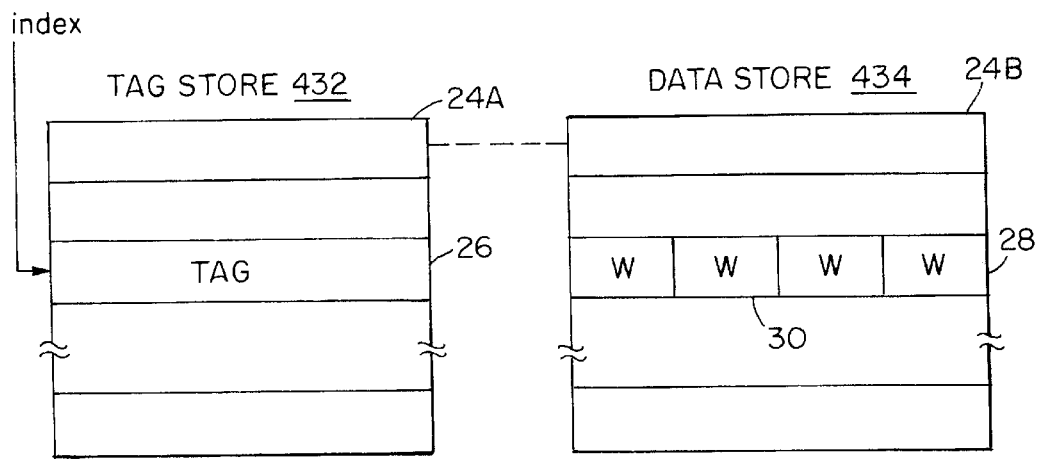
FIG. 5 is a diagram illustrating the structure of the dcache unit of the data cache subsystem of FIG. 4.

Referring now to FIG. 5, the structure of the tag store 432 and data store 434 of dcache unit 430 is there shown. The dcache unit 430 is formed by several lines 24A, 24B in the tag store 432 and data store 434. Each line 24A, 24B includes a tag 26 and a block 28 of words 30. The tag 26 is associated with the four word block 28. An index is used to select a particular line 24A, 24B and word 30 of the dcache unit 430.

Figure 6:
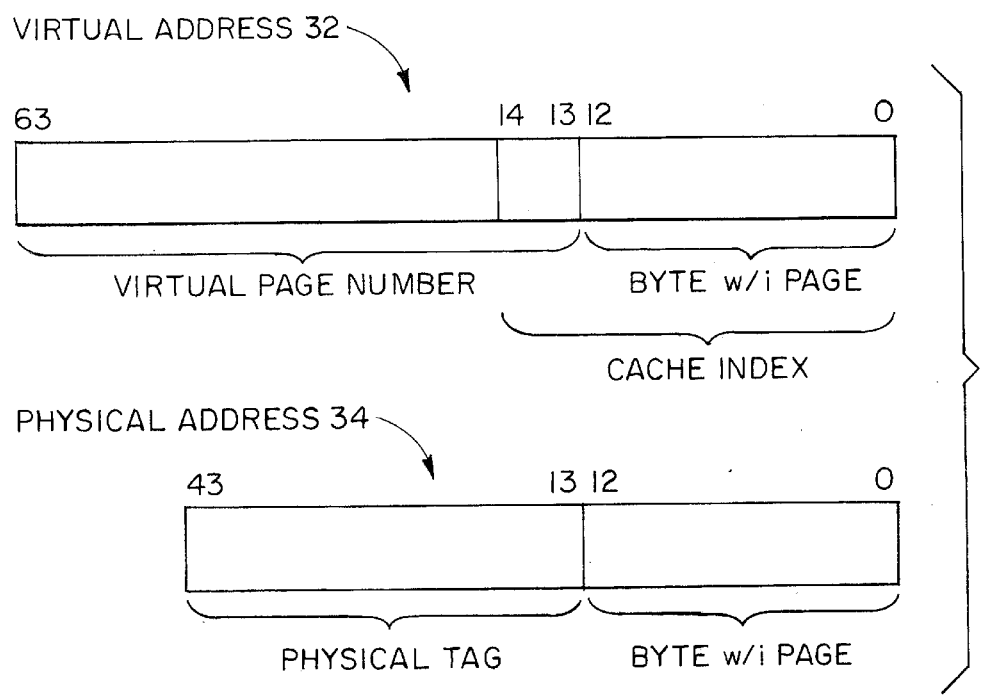
FIG. 6 shows a virtual address format and a physical address format for the subsystem of FIG. 4.

It is common for computer systems to be organized to use virtual addresses to access virtual locations in virtual memory. The virtual address is mapped to a physical address and thus to an actual physical memory location. Different processes running on a computer system can have differing virtual address spaces that map to the same physical address space. FIG. 6 shows an exemplary 64-bit virtual address format 32 and an exemplary 44-bit physical address 34. Bits 13 through 63 (denoted bits 63:13) for the virtual address 32 indicate a virtual page number. The remaining bits (i.e., bits 12:0) for both the virtual address 32 and the physical address 34 indicate the byte within page. Bits 0 through 14 (i.e., bits 14:0) for the virtual address 32 form a virtual index for indexing the dcache unit 430 (FIG. 5). Bits 13 through 43 (i.e., bits 43:13) for the physical address 34 form a physical tag reference for comparing with the tag entries kept in tag store 432 of the dcache unit 430 (FIGS. 4 and 5). Referring again to the data cache subsystem 420 of FIG. 4, the TLB 424 contains entries that provide the mapping function between the virtual addresses used by the execution unit 418 and the physical addresses used by the dcache 430.

Without the bypass mechanism of the present invention, cache access proceeds as follows. A virtual address is input from the execution unit 418 to the TLB 424 where it is translated into a physical address. The virtual address is also parsed to form a virtual index into the dcache unit 430 to address the appropriate cache location. The tag for such location is then compared with a tag reference formed from a parse of the translated physical address using hit compare logic 436. If the tag and the tag reference match, then there is a cache hit and the corresponding data word in the data store 434 is passed to the execution unit 418 on load/store data (LSD) bus 464. If there is not a tag match, then there is a cache miss and the data is fetched from external memory (not shown).

As noted above with reference to FIGS. 2 and 3, a problem can arise wherein a load instruction can have a successful cache hit, but still read in the wrong data because it actually needs the data not yet stored by an older store instruction.

Figure 7:
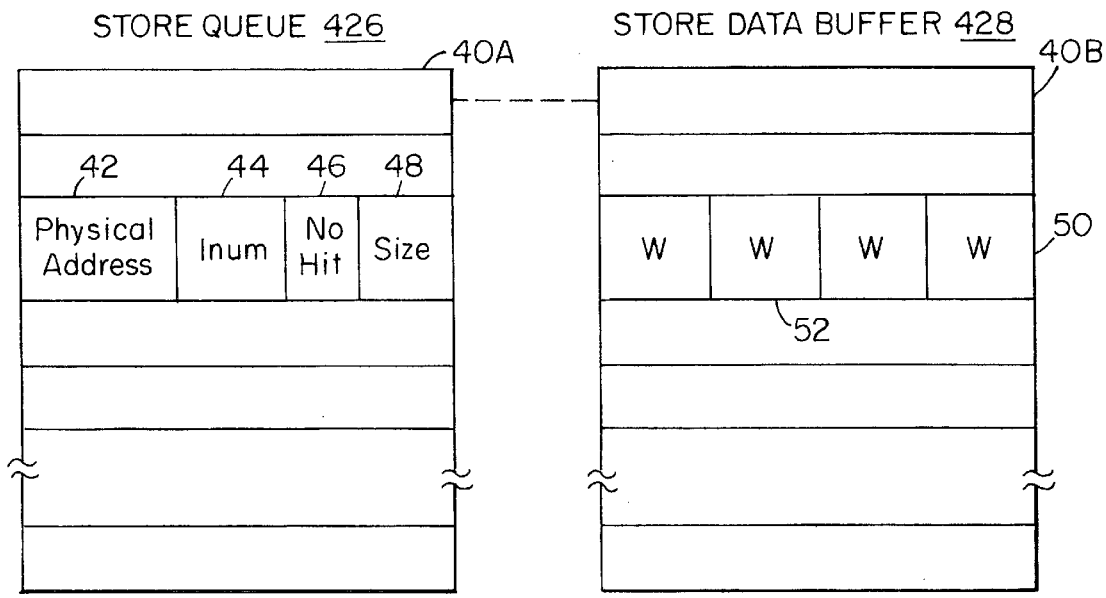
FIG. 7 is a diagram illustrating the structure of the store queue and store data buffer of the data cache subsystem of FIG. 4.

The inventive bypass mechanism will now be described with reference again to FIG. 4. Recently issued, "in-flight" store instructions that have not yet been "committed" or "retired" to main memory are placed in the store queue 426. The store data buffer 428 holds the data entries that correspond to the store instructions held in the store queue 426. FIG. 7 shows the structure of the store queue 426 and store data buffer 428. Several lines 40A, 40B of store instructions are held in the store queue 426 and store data buffer 428, respectively. Each line portion 40A of the store queue 426 includes a physical address 42, an INUM field 44, a NO HIT bit 46 and a size field 48. The NO HIT bit serves as a match status indicator and the size field serves as a data size indicator. Each corresponding line portion 40B includes a block 50 of words 52.

With the store queue 426 holding in-flight store instructions, a query and match of these recent stores can provide the data needed by a load instruction instead of having to retrieve the data from memory.

Figure 8:
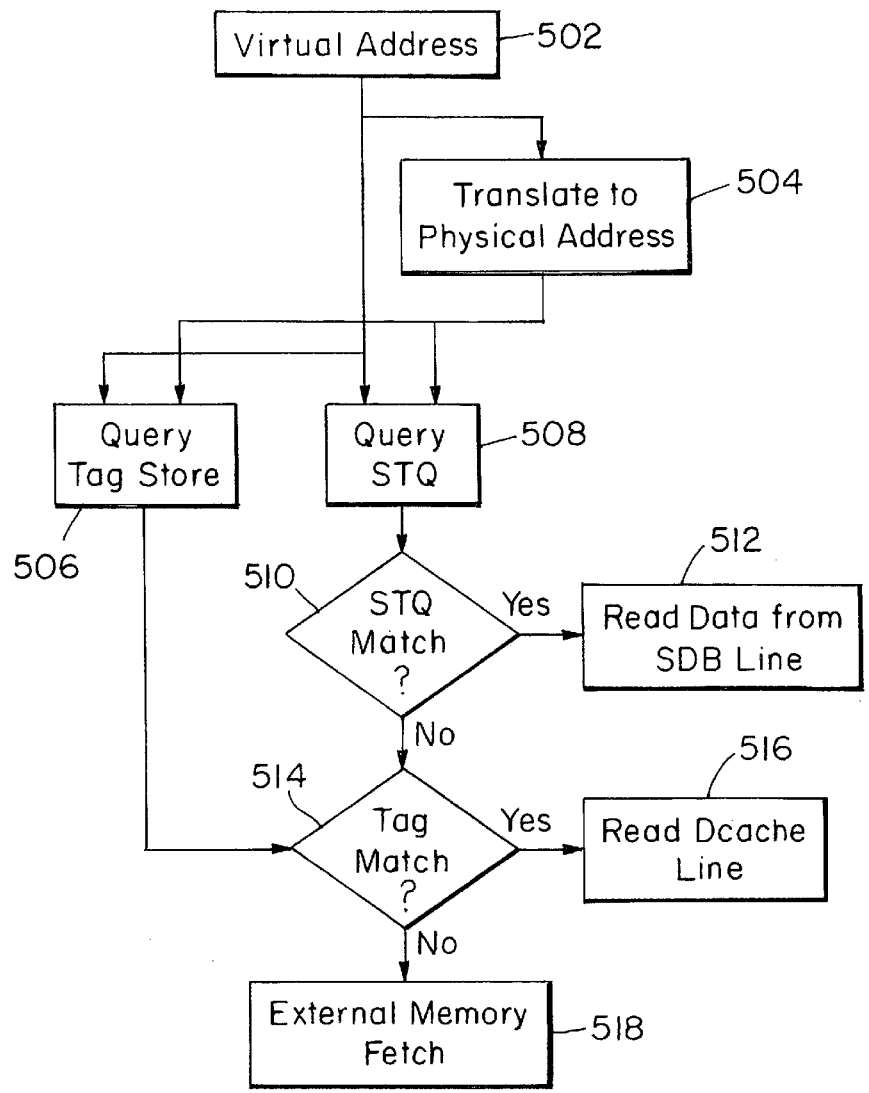
FIG. 8 is a flow diagram illustrating operation of the store queue bypass of FIG. 4.

Referring now to FIG. 8, a flow diagram is there shown which generally illustrates the operation of the store queue bypass mechanism of the present invention. At block 502, a virtual address is provided by the execution unit 418 and is input at block 504 to the TLB 424 for translation into a physical address. In parallel, at blocks 506 and 508, respectively, the tag store 432 and the store queue 426 are queried using bits 14:0 of the virtual address for the virtual index and bits 43:13 of the translated physical address for the tag comparison. If there is a match in the store queue 426 at block 510, then corresponding data is read from the store data buffer 428 at block 512. If there is not a match in the store queue 426, but there is a match in the tag store 432 at block 514, then the corresponding line in data store 434 is read at block 516. If there is not a match in the tag store 432, then an external memory fetch is performed to provide the needed data at block 518.

Referring again to FIG. 4, the match in the store queue 426 is indicated by asserting STQ control line 456. Assertion of STQ control line 456 at multiplexer 438 selects bypass input 460 from store data buffer 428, and the data on bypass line 460 is passed to the execution unit 418 on LSD bus 464.

Figure 9:
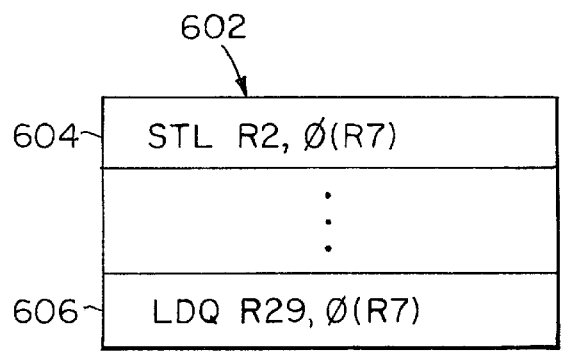
FIG. 9 is a diagram showing an instruction stream that includes a store and load instruction pair having a reference to different size data.

Several difficulties can occur with the bypass mechanism described thus far. For example, it can be the case that a store instruction in the store queue 426 (FIG. 4) that references the same address location as a current load instruction was for a data size that is smaller than the data size of the current load instruction. FIG. 9 shows an exemplary issue stream 602 in which the instruction labeled 604, "stl R2,0 (R7)" is a store instruction wherein the "stl" refers to storing a long word (4 data bytes). The instruction labeled 606, "ldq R29,0 (R7)" is a load instruction wherein the "ldq" refers to loading a quad word (8 data bytes). In this case, because of a mismatch in data size, the load instruction needs to access bytes that are in memory in addition to bytes that are available through the bypass mechanism.

The present invention provides a methodology and apparatus for detecting this mismatch in data size. When a load issues, the available address bits, i.e., virtual address bits 14:0, are compared against each entry in the store queue 426. In addition, the issue INUM 450 (FIG. 4) of the issuing load is compared against the INUM field 44 (FIG. 7) of each store queue entry. If the addresses match and the INUM compare indicates that the load is younger in program order than the particular matching store queue entry, then the bypass mechanism is activated.

Two cycles later the store queue 426 (FIG. 4) is presented with the full physical address of the issuing load. This time the full physical address is compared against each entry in the store queue 426. In addition, the size field 48 (FIG. 7) of the store queue entry is compared against the size information of the issuing load. If the address matches and the INUM compare indicates that the load is younger than the matching store, but the size information indicates that the data size of the matching store is smaller than that of the issuing load, then the store queue 426 provides a TRAP signal 454. The TRAP signal 454 indicates that the data provided by the bypass mechanism was insufficient to satisfy the requirements of the load instruction and therefore, the in-flight instructions should be killed.

Due to time constraints, this size comparison is not performed until some two cycles after the initial address/tag query. While it is possible to avoid the above-noted size mismatch by waiting the two cycles before activating the bypass mechanism, it turns out that through good compiler design the size mismatch is not often encountered. Thus, to always wait the two cycles for a problem that does not often occur would needlessly sacrifice performance.

Another difficulty can occur when there are multiple stores to the same address pending in the store queue 426 at the time a load that needs to read that address issues. The present invention provides a methodology and apparatus for determining which of the multiple stores should be used in bypassing the dcache unit 430.

When a store issues and is placed in the store queue 426, the available address bits are compared against each valid entry of the store queue 426. If the address matches and the INUM comparison indicates that the issuing store is younger than the matching store, then the NO HIT bit 46 (FIG. 7) of that matching store queue entry is set. However, if the INUM comparison indicates that the issuing store is older than the matching store, then the NO HIT bit 46 of the issuing store is set. This mechanism of checking the INUM values and setting the appropriate NO HIT bit is an attempt to provide the data of the most recent store to a subsequently issuing load and thereby avoid getting older data to the load.

When a subsequent load issues, the available address bits are compared against valid entries in the store queue 426. If the address matches, and the INUM comparison indicates that the load is younger in program order than the matching store, then the bypass mechanism is activated, unless the NO HIT bit 46 of the matching store queue entry is set.

Two cycles later the store queue 426 is presented with the full physical address of the issuing load. This time the full physical address is compared against each entry in the store queue 426. If the address matches and the INUM comparison indicates that the load is younger than the matching store, but the data bypass was not activated, then the store queue 426 signals a TRAP signal 454. The TRAP signal 454 indicates that the data bypass mechanism did not provide data when it should have and therefore, the in-flight instructions should be killed.

Figure 10:
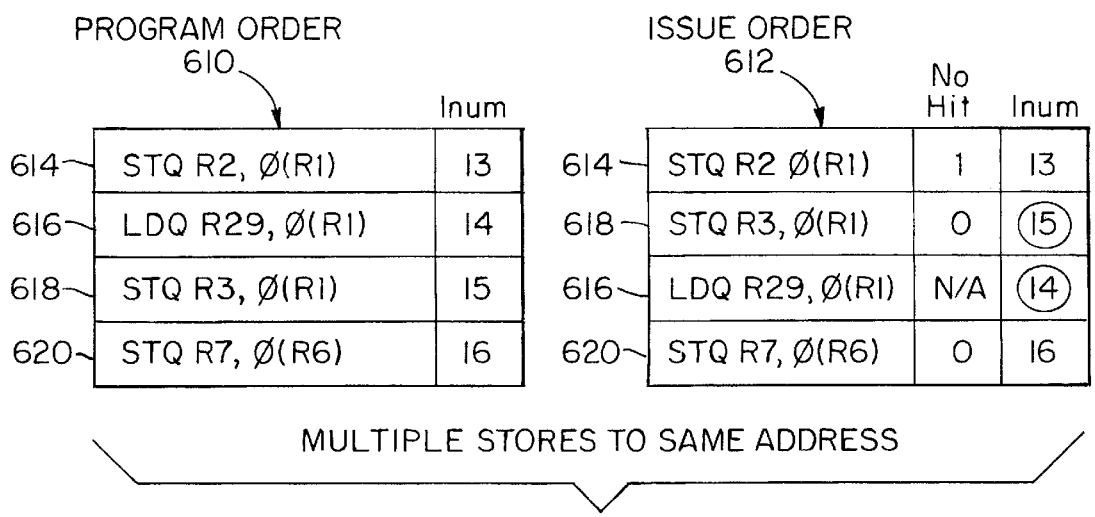
FIG. 10 is a diagram showing an instruction stream in both program order and issue order with multiple stores to the same address.

FIG. 10 illustrates a case in which multiple stores are made to the same address location. A program stream 610 is shown with program instructions 614, 616 and 618 that reference the same address. Program instruction 620 references a different address. Each program instruction has an associated INUM value, e.g., store instruction 614 has an INUM value equal to 13 while store instruction 618 has an INUM value of 15. Thus, store instruction 614 is older in program order than store instruction 618. Issue stream 612 shows these instructions in issue order, that is, store instruction 614 is followed by store instruction 618, load instruction 616 and then store instruction 620. Store instructions 614 and 618 reference the same address. Based on the mechanism described above for setting the NO HIT bit 46 (FIG. 7) for multiple stores to the same address, the NO HIT bit for store instruction 614 has been set, indicating that store instruction 618 should be the most recent store to provide data to a subsequent load.

It is clear, however, from FIG. 10 that if only the NO HIT bit 46 is checked initially without also checking the age (i.e., INUM value) of the instructions when making a query of the store queue 426, then it is possible that the wrong data may be given to a load instruction. As can be seen based on the INUM values, load instruction 616 is actually older than store instruction 618. Thus, a data bypass to provide the data associated with younger store instruction 618 to older load instruction 616 would be in error. A TRAP signal 454 from the store queue 426 signals this error to kill the in-flight instructions.

Another difficulty arises with the fact that the translation look-aside buffer 424 (FIG. 4) operates in parallel with the data bypass mechanism. This means that the full physical address of an issuing load instruction is not available since the virtual to physical translation in TLB 424 is happening at the same time. Thus, the data bypass mechanism must operate on that subset of address bits which are not modified by the TLB translation. However, by operating only on a subset of the address bits, the possibility of false positives and false negatives arises. That is, the data bypass mechanism may determine that a bypass should take place when in fact it is not appropriate (false positive) or a bypass should have taken place when in fact it did not (false negative).

When a load issues, the available address bits are compared against each valid entry in the store queue 426. If the addresses match, and the INUM comparison indicates that the load is younger than the matching store, then the bypass is activated.

Two cycles later the store queue is presented with the full physical address of the load. The full physical address is compared against the store queue entries. If address bits 12:0 match but address bits 43:13 do not match, and the INUM comparison indicates that the load is younger than the matching store, then the store queue 426 signals a TRAP signal 454. The TRAP signal in this case indicates that the data bypass mechanism was activated when in fact it was not appropriate.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a computing system comprising an execution unit for executing load and store instructions from a program and a data cache subsystem, the data cache subsystem including a store queue, a store data buffer and a data cache unit, a method for accessing the data cache subsystem comprising the steps of:

(a) providing a store queue for holding issued stores, the store queue having at least a store queue entry comprising a store queue address;

(b) providing a store data buffer having at least a store data entry corresponding to the store queue entry and comprising at least a data byte;

(c) comparing an address of an issuing load against the store queue address of each store queue entry, and in response to an address match between the issuing load and a particular store queue entry, the particular store queue entry providing an address-matching store queue entry, passing to the execution unit the store data entry in the store data buffer corresponding to the address-matching store queue entry when the issuing load is younger in program order than the address-matching store queue entry wherein each store queue entry and the issuing load includes a data size indicator and further comprising subsequent to steps (a) to (c) comparing the data size indicator of the issuing load against the data size indicator of the address-matching store queue entry and signaling a trap signal when the data size indicator of the issuing load differs from the data size indicator of the address-matching store queue entry.

2. The method of claim 1 wherein each store queue entry includes a match status indicator and step (c) further comprises: comparing an address of an issuing store against the store queue address of each store queue entry and in response to a second address match between the issuing store and a particular store queue entry, setting the match status indicator for the second address-matching store queue entry when the issuing store is younger in program order than the second address-matching store queue entry; and passing to the execution unit the store data entry in the store data buffer corresponding to the address-matching store queue entry when the issuing load is younger in program order than the address-matching store queue entry and the match status indicator for the address-matching store queue entry is not set.

3. The method of claim 2 further comprising subsequently comparing a physical address of the issuing load against the store queue address of each store queue entry and in response to a physical address match between the issuing load and a particular store queue entry, signaling a trap signal when the issuing load is younger in program order than the physical-address-matching store queue entry and the match status indicator for the physical-address-matching store queue entry is set.

4. In a computing system comprising an execution unit for executing load and store instructions from a program and a data cache subsystem, the data cache subsystem including a store queue, a store data buffer and a data cache unit, a method for accessing the data cache subsystem comprising the steps of:

(a) providing a store queue for holding issued stores, the store queue having at least a store queue entry comprising a store queue address;

(b) providing a store data buffer having at least a store data entry corresponding to the store queue entry and comprising at least a data byte;

(c) comparing an address of an issuing load against the store queue address of each store queue entry, and in response to an address match between the issuing load and a particular store queue entry, the particular store queue entry providing an address-matching store queue entry, passing to the execution unit the store data entry in the store data buffer corresponding to the address-matching store queue entry when the issuing load is younger in program order than the address-matching store queue entry further comprising subsequent to steps (a) to (c) comparing a physical address of the issuing load against the store queue address of each store queue entry, and in response to a physical address match between a first address portion of the issuing load and a particular store queue entry forming a physical-address-matching store queue entry, signaling a trap signal when there is a mismatch between a second address portion of the issuing load and the physical-address-matching store queue entry and the issuing load is younger in program order than the physical-address-matching store queue entry.

5. In a computing system comprising an execution unit for executing load and store instructions from a program and a data cache subsystem, the data cache subsystem including a store queue, a store data buffer and a data cache unit, a method for accessing the data cache subsystem comprising the steps of:

(a) providing a store queue for holding issued stores, the store queue having at least a store queue entry comprising a store queue address and a match status indicator;

(b) providing a store data buffer having at least a store data entry corresponding to a store queue entry and comprising at least a data byte;

(c) comparing an address of an issuing store against the store queue address of each store queue entry and in response to a first address match between the issuing store and a particular store queue entry, setting the match status indicator for the first address-matching store queue entry when the issuing store is younger in program order than the first address-matching store queue entry; and (d) comparing an address of an issuing load against the store queue address of each store queue entry and in response to a second address match between the issuing load and a particular store queue entry, passing to the execution unit the store data entry in the store data buffer corresponding to the second address-matching store queue entry when the issuing load is younger in program order than the second address-matching store queue entry and the match status indicator for the second address-matching store queue entry is not set.

6. The method of claim 5 further comprising subsequent to steps (a) to (d) comparing a physical address of the issuing load against the store queue address of each store queue entry and in response to a physical address match between the issuing load and a particular store queue entry, signaling a trap signal when the issuing load is younger in program order than the physical-address-matching store queue entry and the match status indicator for the physical-address-matching store queue entry is set.

7. In a computing system comprising an execution unit for executing load and store instructions from a program, apparatus comprising:

a store queue for holding issued stores, the store queue having at least a store queue entry comprising a store queue address;

a store data buffer having at least a store data entry corresponding to the store queue entry and comprising at least a data byte; and means for comparing an address of an issuing load against the store queue address of each store queue entry and in response to an address match between the issuing load and a particular store queue entry, the comparing means passing to the execution unit the store data entry in the store data buffer corresponding to the address-matching store queue entry when the issuing load is younger in program order than the address-matching store queue entry wherein each store queue entry and the issuing load includes a data size indicator and further comprising size-comparing means for comparing the data size indicator of the issuing load against the data size indicator of the address-matching store queue entry and signaling means for signaling a trap signal when the data size indicator of the issuing load differs from the data size indicator of the address-matching store queue entry.

8. The apparatus of claim 7 wherein each store queue entry includes a match status indicator and wherein the means for comparing further compares an address of an issuing store against the store queue address of each store queue entry and, responsive to a second address match between the issuing store and a particular store queue entry, the comparing means setting the match status indicator for the second address-matching store queue entry when the issuing store is younger in program order than the second address-matching store queue entry; and means for passing to the execution unit the store data entry in the store data buffer corresponding to the address-matching store queue entry when the issuing load is younger in program order than the address-matching store queue entry and the match status indicator for the address-matching store queue entry is not set.

9. The apparatus of claim 8 further comprising means for comparing a physical address of the issuing load against the store queue address of each store queue entry and in response to a physical address match between the issuing load and a particular store queue entry, signaling means for signaling a trap signal when the issuing load is younger in program order than the physical-address-matching store queue entry and the match status indicator for the physical-address-matching store queue entry is set.

10. In a computing system comprising an execution unit for executing load and store instructions from a program, apparatus comprising:

- a store queue for holding issued stores, the store queue having at least a store queue entry comprising a store queue address;
- a store data buffer having at least a store data entry corresponding to the store queue entry and comprising at least a data byte; and
- means for comparing an address of an issuing load against the store queue address of each store queue entry and in response to an address match between the issuing load and a particular store queue entry, the comparing means passing to the execution unit the store data entry in the store data buffer corresponding to the address-matching store queue entry when the issuing load is younger in program order than the address-matching store queue entry further comprising means for comparing a physical address of the issuing load against the store queue address of each store queue entry and, responsive to a physical address match between a first address portion of the issuing load and a particular store queue entry, signaling means for signaling a trap signal when there is a mismatch between a second address portion of the issuing load and the physical-address-matching store queue entry and the issuing load is younger in program order than the physical-address-matching store queue entry.

11. In a computing system comprising an execution unit for executing load and store instructions from a program, apparatus comprising:

- a store queue for holding issued stores, the store queue having at least a store queue entry comprising a store queue address and a match status indicator;
- a store data buffer having at least a store data entry corresponding to the store queue entry and comprising at least a data byte;
- first comparing means for comparing an address of an issuing store against the store queue address of each store queue entry and in response to a first address match between the issuing store and a particular store queue entry, the first comparing means setting the match status indicator for the first address-matching store queue entry when the issuing store is younger in program order than the first address-matching store queue entry; and
- second comparing means for comparing an address of an issuing load against the store queue address of each store queue entry and in response to a second address match between the issuing load and a particular store queue entry, the second comparing means passing to the execution unit the store data entry in the store data buffer corresponding to the second address-matching store queue entry when the issuing load is younger in program order than the second address-matching store queue entry and the match status indicator for the second address-matching store queue entry is not set.

12. The apparatus of claim 11 further comprising means for comparing a physical address of the issuing load against the store queue address of each store queue entry and in response to a physical address match between the issuing load and a particular store queue entry, signaling means for signaling a trap signal when the issuing load is younger in program order than the physical-address-matching store queue entry and the match status indicator for the physical-address-matching store queue entry is set.

* * * * *